United States Patent [19]

Boyd

[11] 4,212,346
[45] Jul. 15, 1980

[54] VARIABLE HEAT TRANSFER DEVICE

[75] Inventor: Edward S. Boyd, Yorba Linda, Calif.

[73] Assignee: Rockwell International Corporation, El Sugundo, Calif.

[21] Appl. No.: 834,619

[22] Filed: Sep. 19, 1977

[51] Int. Cl.² .............................................. G05D 23/00
[52] U.S. Cl. ........................................ 165/32; 62/383; 165/185; 236/100; 236/DIG. 12
[58] Field of Search .................. 165/185, DIG. 7, 32, 165/96; 236/DIG. 12, 100; 62/383; 337/315

[56] References Cited

U.S. PATENT DOCUMENTS

| | | | |
|---|---|---|---|
| 3,112,878 | 12/1963 | Snelling | 165/32 X |
| 3,244,224 | 4/1966 | Hnilicka | 165/32 |
| 3,478,819 | 11/1969 | Reinke | 165/32 |
| 3,717,201 | 2/1973 | Hosmer et al. | 165/96 |
| 3,721,101 | 3/1973 | Sheppard et al. | 62/382 X |
| 3,957,107 | 5/1976 | Altoz et al. | 165/32 |

FOREIGN PATENT DOCUMENTS 2461041 7/1975 Fed. Rep. of Germany ............ 236/100

Primary Examiner—Albert W. Davis
Assistant Examiner—Margaret A. Focarino
Attorney, Agent, or Firm—H. Fredrick Hamann; Gilbert H. Friedman

[57] ABSTRACT

A thermal switch having relatively high gain for stabilizing the temperature of a heat source or a heat sink, especially useful in vacuum applications. A strip of heat conducting material is disposed to conduct heat from one heat station to another heat station. The contact made between the strip of heat conducting material and a heat station is subjected to a variable contact pressure. This contact pressure varies in response to changes in the temperature of a quantity of a heat expandable fluid material confined to a chamber thermally connected to whichever heat station is to be subjected to temperature c ol. This fluid preferably has a high bulk modulus. The fluid actuates a piston disposed to bear against the strip of heat conducting material whereby the pressure at the interface between the strip and the contacted heat station is varied. The heat conducting materials in contact with each other at this interface preferably have a low yield strength. Other features of the invention provide for accurate alignment of the contacting surfaces to each other and for eliminating mechanical offset at a desired initial point on the operating characteristic of the thermal switch.

21 Claims, 3 Drawing Figures

VARIABLE HEAT TRANSFER DEVICE

The invention herein described was made in the course of or under a contract or subcontract thereunder, with the U.S. Air Force.

BACKGROUND OF THE INVENTION

1. Field of the Invention

This invention relates to heat transfer control apparatus and, more particularly, pertains to a variable heat transfer device, or thermal switch, capable of varying its thermal resistance to the transfer of heat from a warmer body to a colder body in response to changes in the temperature of one or the other of said bodies.

2. Description of the Prior Art

As is well known, there are three basic ways of transferring heat from a heat source to a heat sink, viz, convection, conduction or radiation. In convection, a fluid, either a gas or a liquid, picks up heat from a source and transfers the heat through movement of the fluid and contact with a heat sink. In radiation, energy is propagated through space or material in the form of electromagnetic waves or corpuscular emissions. Conduction occurs when one solid body is in contact with another or where an intermediate body of a gas, a liquid or another solid material is interposed between the two bodies so as to act as a heat conducting medium.

For certain applications, such as, for example, in space vehicles or in a vacuum generally, convection is not a readily available heat transfer mechanism. The most common method by which heat is dissipated from space vehicles is by radiation from the outer surface thereof. Often, however, there are components and systems within such vehicles which are required to be maintained at substantially constant temperatures despite the operation of factors which tend to cause temperature variations. Dissipation of heat by radiation alone usually will not satisfy this requirement for local temperature stability. In these cases, heat is required to be transferred to the heat sink by conduction in a manner which produces the local temperature stability.

A thermal switch is a device which provides a variable thermal resistance, or conductance, and is generally temperature actuated. The thermal actuation devices most commonly found are, for example, bimetallic devices, expanding fluids, and materials which expand when undergoing a phase change. The latter include, for example, certain waxes such as those which are commonly used in automobile thermostats. Many thermal switches use metal conductors as the actual heat transfer medium although some switches use heat pipes for thermal conduction.

A heat pipe comprises a casing of heat conducting material and an interior sealed chamber containing a heat transfer fluid, such as water, which exists in both its liquid and vapor phase in the chamber. The fluid undergoes a closed thermodynamic cycle involving vaporization or boiling of the liquid in the heat input or evaporator section of the heat pipe and flow of the resulting vapor to the heat output or condenser section of the pipe. The fluid condenses to the liquid phase in the condenser section whereupon it is returned to the evaporator section by capillary flow in a wick saturated with the liquid. The cycle is then repeated.

A thermal switch using a bimetallic device is disclosed in Riordan, U.S. Pat. No. 3,225,820 issued Dec. 28, 1965. A thermal connection between a component package generating heat and a heat sink is provided by and through a bimetallic element. The bimetallic element responds to changes in the temperature of the heat sink to vary the effective contact area between the bimetallic element and the heat sink. As is well known, thermal conductance and contact area are related to each other directly.

Another example of a thermal switch using a bimetallic device is disclosed in Kelly, U.S. Pat. No. 3,302,703 issued Feb. 7, 1967. A gap between a heat source and a heat sink is enclosed in a sealed housing substantially filled with a low-thermal-conductivity gas such as carbon dioxide. The sealed housing includes a reservoir in the form of a bellows which holds a supply of a liquid thermal conductor such as mercury. Pressure on the bellows causes the mercury to be forced into the gap between the heat source and heat sink while the gas is displaced into a second reservoir. A bimetallic element responsive to temperature changes in either the heat source or the heat sink produces changes in the pressure on the bellows, thereby varying the thermal conductivity across the gap.

In Townsend, U.S. Pat. No. 3,390,717 issued July 2, 1968, there is a discussion of the mechanism of heat transfer from one solid metal plate to another in a vacuum. The thermal resistance is inversely proportional to the area of contact between the two plates. The rate of heat transfer from one plate to the other is varied by changing the pressure tending to force the plates together. This phenomenon occurs because even highly polished plates will have valleys and ridges on their juxtaposed surfaces. These ridges and valleys cause spaces and voids between the plates where they are not in actual contact. This effect is discussed further in Sheppard et al, U.S. Pat. No. 3,721,102 issued Mar. 20, 1973. It is stated therein that the thermal conductivity of a physical contact between two surfaces in a hard vacuum is proportional to the true surface area of the contact and, therefore, is inversely related to the yield strength of the contacting materials and directly related to the normal force between the contacting surfaces. An approximate mathematical relationship between pressure, yield strength, and thermal conductance derived empirically is given in Aron and Colombo, ASME Paper No. 63-WA-196, "Controlling Factors of Thermal Conductance Across Bolted Joints in a Vacuum Environment", Winter Annual Meeting of The American Society of Mechanical Engineers, Philadelphia, Pa., Nov. 17-22, 1963. The thermal conductance at a bolted joint is given by a constant exponential of the ratio of pressure to yield strength of the particular metal at a heat conducting interface.

In Myers, U.S. Pat. No. 3,463,224 issued Aug. 26, 1969, there is disclosed a thermal switch comprising a bellows filled with a heat expandable fluid. The bellows is in continual thermal contact with a heat sink. A temperature rise of the heat sink causes the expandable fluid to extend the bellows, whereupon thermal circuits from the source to the sink are closed through metal conductors.

A thermal switch similar to the one disclosed in Myers, supra, but employing a heat pipe for thermal conduction is disclosed in Cline, U.S. Pat. No. 3,399,717 issued Sept. 3, 1968. The switch comprises a pair of sealed bellows disposed in concentric relationship. The inner bellows is filled with a heat expandable fluid while the expandable chamber space between the inner and outer bellows contains a two phase fluid and a capillary element or wick to form the heat pipe. A plate at one end of the bellows assembly is in contact with a heat source. A raised temperature at the heat source causes expansion of the heat expandable fluid which, in turn, expands the bellows bringing a plate at the opposite end thereof into contact with a heat sink.

As a general proposition, it may be said that the prior art devices discussed hereinabove have relatively low gain. That is because bimetallic elements and bellows, used separately or in combination, require relatively large temperature changes to produce appreciable displacements or forces for actuation.

3. Prior Art Statement

The most pertinent prior art discovered by applicant relative to this invention is listed herewith:

(1) Reinke, "Variable Heat Conductor", U.S. Pat. No. 3,478,819 issued Nov. 18, 1969;

(2) Sheppard et al, "Method and Apparatus for Cooling a Load", U.S. Pat. No. 3,721,101 issued Mar. 20, 1973.

The patent to Reinke discloses a thermal switch having a cylindrical chamber formed in a heat source. A first portion of this chamber contains a thermally responsive element which may be a material which changes state and expands at a selected temperature. Expansion of the thermally responsive element forces a heat conductor piston to extend from the cylindrical chamber in the heat source into a cup-shaped chamber in a heat sink. So extended, the piston is in thermal contact with both the heat source and the heat sink. The thermal resistance between the piston and the heat source is substantially constant. However, the area at the contact made between the piston and the walls of the cup-shaped chamber in the heat sink is proportional to the extension or depth of penetration of the piston into the cup-shaped chamber. There is thereby produced a variable thermal resistance between the heat source and heat sink.

The patent to Sheppard et al discloses a controllable heat flow path between a first heat station and a second heat station. A flexible copper strip is in thermal contact with and affixed to the first heat station at one end thereof. At the other end thereof, the copper strip is disposed to be engaged and disengaged with the second heat station by means of a rod which extends externally from the primary housing of the device. The pressure at the thermal contact between the copper strip and the second heat station is controllable by applying a variable force to the externally disposed end of the rod.

SUMMARY OF THE INVENTION

The general purpose of this invention is to provide a variable heat transfer device, or thermal switch, having a relatively high gain. That is, the invention exhibits a relatively large change in thermal conductance in response to a sensed change in temperature. Thus, the present invention provides a flexible strip of heat conducting material disposed to conduct heat from one heat station to another heat station. The contact made between the strip of heat conducting material and at least one heat station is subjected to a variable contact pressure. High gain is achieved, in part, because a relatively large change in this contact pressure is produced by a relatively small change in the temperature of an actuator. The actuator comprises a heat expandable material which drives a piston against the strip of heat conducting material. A relatively small displacement of the actuator and piston causes a large change in contact pressure. In addition, the achievement of relatively large heat conductance for relatively low contact pressures is obtained through the use of low yield strength metals on flat polished surfaces at the contact interface. As another feature of the invention contributing to its high gain, the flexible strip of heat conducting material is fabricated to be non-resilient.

BRIEF DESCRIPTION OF THE DRAWINGS

Like reference numerals designate like parts throughout the figures. It should be noted that the figures have not been drawn to scale, the relative dimensions having been chosen primarily for the sake of illustrating the operation of the invention.

DESCRIPTION OF THE PREFERRED EMBODIMENTS

Figure 1:
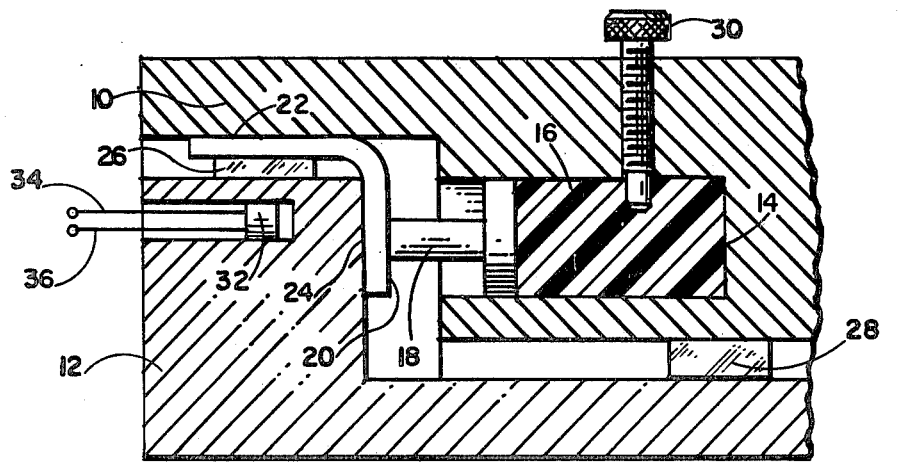
FIG. 1 is a sectional view which shows a thermal switch in accordance with the present invention.

Referring now to FIG. 1, there is shown a thermal switch 8 having a first heat station 10 and a second heat station 12. One of the heat stations 10 and 12 is a heat source while the other is a heat sink. Thermal switch 8 will work equally well if heat station 10 is the heat source and heat station 12 is the heat sink or vice versa. However, in each case, for the thermal switch 8 shown in FIG. 1, heat station 10, will have its temperature controlled by the operation of this invention.

Heat stations 10 and 12 are both preferably made of materials which are good conductors for heat. The materials which are preferred for this purpose are metals such as, for example, copper and aluminum as is well known in the art. Copper is preferable for the heat conducting material if small size is a primary requirement for the application. Aluminum is preferred if a desire to achieve low weight for the apparatus is a primary consideration as in spacecraft applications. Silver and gold are also excellent heat conductors but are used less frequently because of their high cost and weight. Other thermally conductive materials are also contemplated within this concept.

Heat station 10 has its temperature controlled by thermal switch 8 because, in this embodiment, a portion of heat station 10 is a housing for a chamber 14 provided therein. The chamber 14, which may be formed as a cylinder, contains a heat expandable fluid or plastic material 16 which serves as an actuator for thermal switch 8. For the purposes of this specification, the terms fluid and plastic will be taken to refer to any material which will tend to conform to the outline of its container. When the temperature of heat station 10 rises, the temperature of the heat expandable fluid material 16 is forced to rise also. The actuator material 16 then expands against a piston 18 fitted to the chamber 14.

Piston 18 bears against a strip 20 of heat conducting material. The strip 20 is preferably a thin flexible strip of any good heat conducting metal such as, for example, copper or aluminum. Strip 20 is thermally connected to heat station 10 in the region shown thereon at 22. Strip 20 is also in thermal contact with heat station 12 in the region shown thereon at 24. As the piston 18 is driven against strip 20, contact pressure between strip 20 and the region 24 of heat station 12 builds up and causes a rise in the thermal conductance, or drop in the thermal resistance, of the contact or thermal interface. Heat may then be transferred between heat stations 10 and 12 more readily, the heat flowing from the heat source to the heat sink. A reduction in thermal resistance across the contact implies that less temperature drop across the contact is required for a given rate of heat transfer.

The actuator material 16 may be of any fluid or plastic material which has both a relatively high bulk modulus and a relatively high thermal coefficient of expansion, or the equivalent thereof. Alcohol is an example of a liquid which is suitable for this purpose. As another example, certain waxes undergo a significant volume increase as they are transformed from their solid phase to their liquid phase. As has been mentioned above, these waxes are used as actuator materials in automobile thermostats. They are also suitable for use as the actuator material 16 in the present invention. For the purposes of this specification, these waxes are regarded as having the equivalent of high bulk modulus and high thermal coefficient of expansion. However, for the application of this invention to spacecraft, for example, the use of either alcohol or wax as the actuator material 16 has the drawback that either elaborate sealing would be required to retain the material for any significant period of time or else there would eventually be a considerable loss of the material due to vaporization. For spacecraft and vacuum applications generally, it is preferable to use as an actuator material 16 a highly viscous (coagulated) fluid or plastic such as, for example, a cured elastomer. The silicone rubber sold under the designation RTV-11 by the General Electric Company, for example, forms a cured elastomer suitable for this purpose. Typically, the chamber 14 is filled to the desired extent with the silicone rubber in a vacuum to insure that no bubbles or voids are formed in the rubber which would reduce its effective bulk modulus. Once cured to high viscosity, the rubber is baked to remove any volatile oils therefrom. Thenceforth, in a vacuum, the rubber can be expected to be retained within the chamber 14 without any sealing other than that provided by the piston 18 for a period extending over several years.

By developing relatively large contact pressures in response to relatively small changes in temperature, the actuator material 16, as described above, is a significant factor in making the present invention a high-gain thermal switch.

A spacer 26 of thermally insulating material is shown interposed between heat conducting strip 20 and heat station 12 in FIG. 1. Another spacer 28 of thermally insulating material is shown interposed between heat station 10 and heat station 12. Although heat stations 10 and 12 are spaced apart from each other by spacers of thermally insulating material such as, for example, spacers 26 and 28, it is not necessary that the thermal insulation between heat stations 10 and 12 be absolute or perfect. In the preferred embodiment of this invention, a thermal switch is designed so that spacers of insulating material carry substantially all of the heat from the heat source to the heat sink at the maximum expected temperature difference between them. Then, as the temperature difference between the heat stations is reduced from their maximum, additional heat transfer is effected by way of the heat conducting strip 20. This approach makes optimum use of the dynamic range of thermal switch 8 and contributes to making it a high gain device.

Two features of thermal switch 8 as shown in FIG. 1 are provided for the purpose of removing any offset or dead zone from the operation thereof. These features include adjusting device 30 which may be, for example, a threaded bolt and temperature sensor 32 which may be, for example, a thermistor having leads 34 and 36. Adjusting device 30 can be manipulated to selectively displace actuator material 16 to thereby adjust the contact pressure between thin conducting strip 20 and region 24 at heat station 12. The adjustment may establish, for example, the minimum required contact pressure between strip 20 and heat station 12 at the point on the operating characteristic of thermal switch 8 where the temperature difference between heat stations 10 and 12 is at a maximum. This may be accomplished by advancing the bolt 30 until the temperature sensor 32 gives the first small indication that its temperature is changing to be closer to that of heat station 10. This indication will occur at the point where pressure on the contact is at or slightly above zero.

Thermally insulating spacers 26 and 28 also serve to illustrate that heat stations 10 and 12 are preferably mounted with respect to each other so that the operating parts of thermal switch 8 will maintain a relatively fixed position with respect to each other. With such a mounting, neither offset nor dead zone tends to be introduced into the operation of thermal switch 8 once it has been adjusted as described above.

Figure 2:
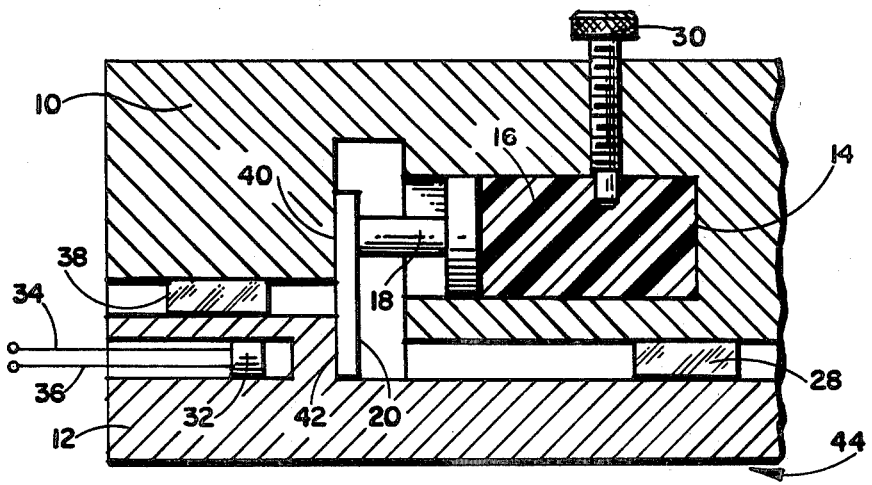
FIG. 2 is an alternative embodiment of the thermal switch of the instant invention.

Referring now to FIG. 2, there is shown another embodiment of the instant invention. The switch embodiments are similar in concept, but have several different structural arrangements. For example, thermal switch 8 of FIG. 1 may be characterized as having the thermal actuator 16 in thermal contact with one of the heat stations, e.g. heat station 10, while the variable conductance thermal contact of strip 20 is made with the remaining heat station, i.e. heat station 12. On the other hand, FIG. 2 depicts a thermal switch 44 wherein the major distinction from thermal switch 8 is that thermal switch 44 has the thermal actuator 16 in thermal contact with the same heat station, e.g. heat station 10, which has the variable thermal conductance contact with thin strip 20. This variable thermal conductance contact is shown in the region 40 of heat station 10.

Thermal switch 44 also differs from thermal switch 8 in that strip 20 of heat conducting material describes a comparatively straight path in FIG. 2 while it has an approximately ninety degree bend in FIG. 1. In either case, it is desirable that strip 20 be flexible and also non-resilient as will be discussed hereinafter in connection with the discussion of FIG. 3.

Thermally insulating spacer 38 of FIG. 2 is part of the mounting for, and is mounted between, heat stations 10 and 12 while corresponding heat spacer 26 of FIG. 1 is mounted between the strip 20 and heat station 12. Either approach is acceptable.

The heat sensor 32 is shown in heat station 12 in FIG. 2 as it was in FIG. 1. However, heat sensor 32 may be placed in either heat station 10 or 12 in either thermal switch 8 or 44 for adjusting the contact pressure to the desired initial point on the operating characteristic.

Figure 3:
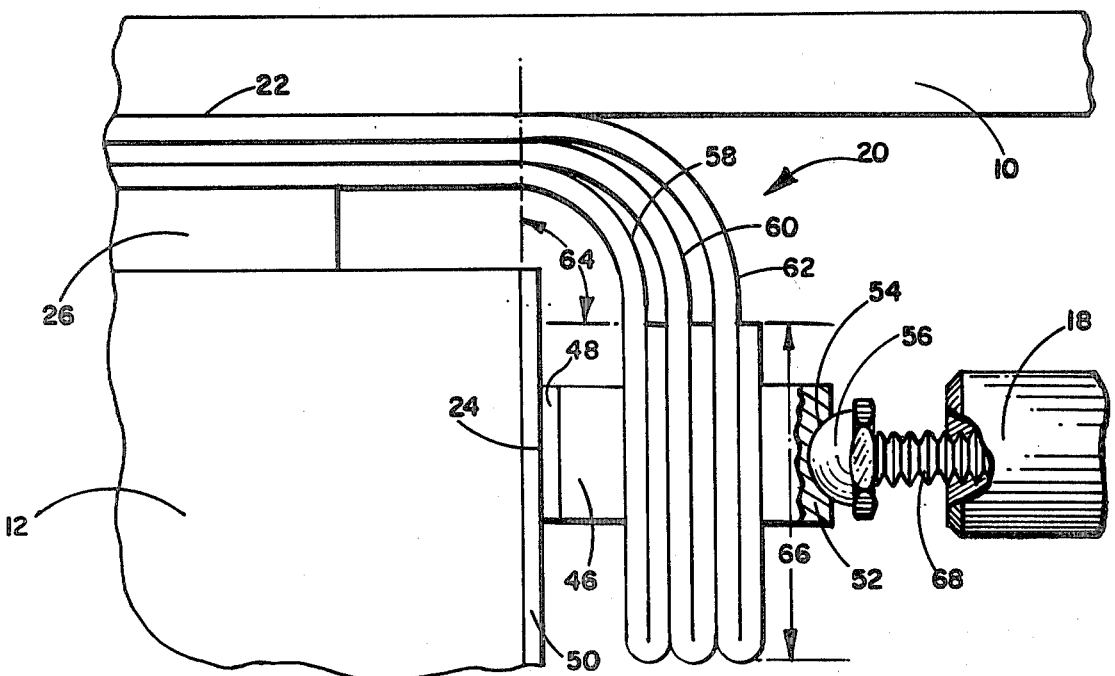
FIG. 3 is a detail drawing of a portion of the thermal switch shown in FIG. 1.

FIG. 3 shows a portion of the thermal switch 8 of FIG. 1 broken away and enlarged to display certain features of the invention in greater detail. In FIG. 3, strip 20 of conductive material is shown being driven against the contact region 24 of heat station 12 by the piston 18.

The strip 20 is preferably soldered to the region 22 of heat station 10 to form a permanent thermal connection between them. The strip 20 is in thermal contact with the region 24 of heat station 12 through contact block 46. The strip 20 is preferably soldered to contact block 46. Contact block 46 is of a good heat conducting metal such as, for example, copper. The face of contact block 46 closest to heat station 12 is preferably polished flat and then covered with a layer 48 of a low yield strength metal, preferably by electroplating, thermocompression bonding, or soldering. Similarly, the contact region 24 of heat station 12 is preferably polished flat and then covered with a layer 50 of a low yield strength metal, preferably by electroplating, thermocompression bonding, or soldering. There is thus formed a metal-to-metal contact of low yield strength metals between contact block 46 and heat station 12. The lower the yield strength of the metal layers 48 and 50, the lower will be the thermal resistance of their interface at any particular contact pressure when they are pressed into contact with each other, as was discussed above. Similarly, the finer the polish on the interfacing surfaces and the more precise the flatness of those surfaces, the lower will be the thermal resistance of the interface at any particular contact pressure as is well known. These factors which tend to reduce the thermal resistance for a particular contact pressure are each features of the invention which tend to make it a high gain device.

The low yield strength metal may be, for example, indium or tin. These are both known to have very low yield strengths, that of indium being approximately 300 psi and that of tin being about 3000 psi. Tin is preferred, particularly for applications in spacecraft, because tin oxide is known to have a very low vapor pressure. A surface of tin will, thus, tend to be self-cleaning in a vacuum thereby tending to lower the thermal resistance of the contact interface even further.

It will be apparent to those skilled in the art that a misalignment of contact block 46 with respect to the surface at heat station 12 in the region 24 will tend to increase contact resistance for a particular contact pressure. Therefore, it is desirable and preferable that the effects of any fabrication errors leading to a misalignment of the piston 18 relative to heat source 12 be compensated. As an example, this compensation may be accomplished, as shown in FIG. 3, by means of a second contact block 52 soldered to conductive strip 20 interposed between strip 20 and the piston 18. Contact block 52 includes hemispherical socket 54 adapted to receive a hemispherical ball 56 on the end of a bolt 68 carried by the piston 18. The ball and socket joint thus formed will tend to be self-adjusting in the removal of the effects of misalignment.

As an alternative approach to the use of adjusting device 30 for removing offset or dead zone as discussed above in connection with FIG. 1, the bolt 68, which is threadably engaged with the piston 18, may be rotated for this same adjustment.

An additional feature provided in the preferred embodiment of this invention also serves to prevent misalignment of contact block 46 with respect to heat station 12. The thin strip 20 of conducting material, as shown in FIG. 3, preferably comprises a plurality of even thinner ribbons of the conducting material in a stack. Only three such ribbons, 58, 60, and 62 are shown in FIG. 3 for the sake of illustration. However, those skilled in the art will recognize the desirability of forming strip 20 from as many very thin ribbons of, for example, copper or aluminum foil as is desirable to provide a strip 20 having very low thermal resistance but, at the same time, negligible resistance to flexing. Such a flaccid strip 20 will not itself cause misalignment between contact block 46 and heat station 12. Also, a strip 20 which is a stacked composite of many very thin ribbons, will have negligible resilience and, therefore, will not exert any spring force toward either contact block 46 or 52. Thus, the strip 20 will neither aid nor detract from the effect of the piston 18 in creating contact pressure. The non-resilience of a strip 20 is another feature contributing to the high gain of the invention.

As shown in FIG. 3, in the intermediate region 64 of strip 20, the individual ribbons 58, 60 and 62 of metal foil are free of solder and separated from each other. The freedom from solder and the separation of the ribbons from each other in the region 64 enhances the lack of resilience or flaccidity of the strip 20. The separation of the ribbons from each other will tend to occur naturally as the strip 20 is bent to accommodate the approximately 90 degree turn shown in region 64. However, the separation will be enhanced and will be present even in the absence of a bend in strip 20 by folding the ends of the ribbons 58, 60 and 62 of foil back on themselves as shown in the region designated by the double-ended arrow 66 of FIG. 3. This will cause that end of the strip 20 to have double thickness over a length thereof.

To aid in heat conduction, it is desirable for the plurality of ribbons 58, 60 and 62 comprising the strip 20 to be in good thermal contact with each other in the regions adjacent the thermal connections of the strip 20 to heat stations 10 and 12. In the preferred embodiment of this invention, therefore, the ribbons 58, 60 and 62 of the strip 20 are reflow soldered to the region 22 of heat station 10, to the contact blocks 46 and 52, and to each other everywhere except in the intermediate portion of strip 20 as indicated by the curved double-ended arrow 64.

While the invention has been shown and described with reference to certain preferred embodiments thereof, it will be understood by those skilled in the art that various changes in details may be made therein without departing from the spirit and scope of the invention as set out in the following claims.

Having thus described preferred embodiments of the invention, what is claimed is:

1. A thermal switch comprising:
    a first heat station of heat conducting material;
    a second heat station of heat conducting material;
    a strip of heat conducting material extending between said first heat station and said second heat station, said strip having a thermal conduction interface with said first heat station at a first region of said strip, a thermal conduction interface with said second heat station at a second region of said strip wherein said second region is longitudinally displaced along said strip from said first region, and an intermediate region extending longitudinally along said strip between said first and second regions, wherein, in said intermediate region, said strip comprises a plurality of thin ribbons consisting of metal foil formed in a flaccid stack; and
    thermal actuator means for varying contact pressure at said thermal interface of said strip with a selected one of said first and second heat stations in response to temperature changes of said first heat station.

2. A thermal switch as recited in claim 1 wherein said thermal actuator means comprises:
   a housing of heat conducting material thermally connected to said first heat station, said housing having a chamber therein;
   a body of a heat expandable fluid filling a portion of said chamber and responsive to temperature changes of said first heat station; and
   a piston fitted to said chamber for relative motion with respect to said housing, said piston in operating contact with said heat expandable fluid within said chamber, said piston extending from said chamber into operating contact with said strip, wherein said piston is disposed to vary said contact pressure at said thermal interface at said selected heat station in response to temperature changes of said heat expandable fluid.

3. A thermal switch as recited in claim 2 wherein said heat expandable fluid has a relatively high bulk modulus.

4. A thermal switch as recited in claim 3 wherein said heat expandable fluid has a relatively high thermal coefficient of expansion.

5. A thermal switch as recited in claim 4 wherein said heat expandable fluid is selected from the group consisting of alcohol, wax, and a cured elastomer.

6. A thermal switch as recited in claim 5 wherein said cured elastomer is silicone rubber.

7. A thermal switch as recited in claim 2 comprising adjusting means for determining a selected contact pressure at said thermal interface at said selected heat station for a selected temperature of said first heat station.

8. A thermal switch as recited in claim 1 wherein said heat conducting material of said strip is flexible.

9. A thermal switch as recited in claim 8 wherein said heat conducting material of said strip is non-resilient.

10. A thermal switch as recited in claim 9 wherein said strip comprises a plurality of thin ribbons of said heat conducting material.

11. A thermal switch as recited in claim 1 wherein said thermal interface of said strip with said selected heat station comprises a metal-to-metal contact wherein at least one metal of said metal-to-metal contact has a relatively low yield strength.

12. A thermal switch as recited in claim 11 wherein said metal is selected from the group consisting of indium and tin.

13. A thermal switch as recited in claim 1 wherein said first heat station is a heat source, whereby the temperature of said heat source is regulated by said thermal switch, and wherein said second heat station is a heat sink.

14. A thermal switch as recited in claim 13 wherein said selected heat station is said heat source.

15. A thermal switch as recited in claim 13 wherein said selected heat station is said heat sink.

16. A thermal switch as recited in claim 1 wherein said first heat station is a heat sink, whereby the temperature of said heat sink is regulated by said thermal switch, and wherein said second heat station is a heat source.

17. A thermal switch as recited in claim 16 wherein said selected heat station is said heat sink.

18. A thermal switch as recited in claim 16 wherein said selected heat station is said heat source.

19. Apparatus for the transfer of heat by conduction comprising:
   a first heat conducting member;
   a second heat conducting member in contact with and having a thermal interface with said first heat conducting member;
   means responsive to temperature for bearing against said heat conducting member to vary contact pressure at said thermal interface; and
   adjusting means for providing a selected contact pressure at said thermal interface;
   said second heat conducting member comprising at least one flaccid strip of heat conducting metal.

20. Apparatus as recited in claim 19 wherein said strip comprises a stack of a plurality of ribbons of foil of said metal.

21. A thermal switch, comprising:
   a first heat station of heat conducting material;
   a second heat station of heat conducting material;
   a strip of heat conducting material extending between said first heat station and said second heat station, said strip having a thermal interface with said first heat station and a thermal interface with said second heat station;
   thermal actuator means for varying contact pressure at said thermal interface of said strip with a selected one of said first and second heat stations in response to temperature changes of said first heat station, wherein said thermal actuator means comprises:
      a housing of heat conducting material thermally connected to said first heat station, said housing having a chamber therein;
      a body of a heat expandable fluid filling a portion of said chamber and responsive to temperature changes of said first heat station; and
      a piston fitted to said chamber for relative motion with respect to said housing, said piston in operating contact with said heat expandable fluid within said chamber, said piston extending from said chamber into operating contact with said strip, wherein said piston is disposed to vary said contact pressure at said thermal interface at said selected heat station in response to temperature changes of said heat expandable fluid; and
   adjusting means for providing a selected contact pressure at said thermal interface at said selected heat station for a selected temperature of said first heat station.

* * * * *